J. G. BODEMER.
GOVERNOR.
No. 179,760.  Patented July 11, 1876.
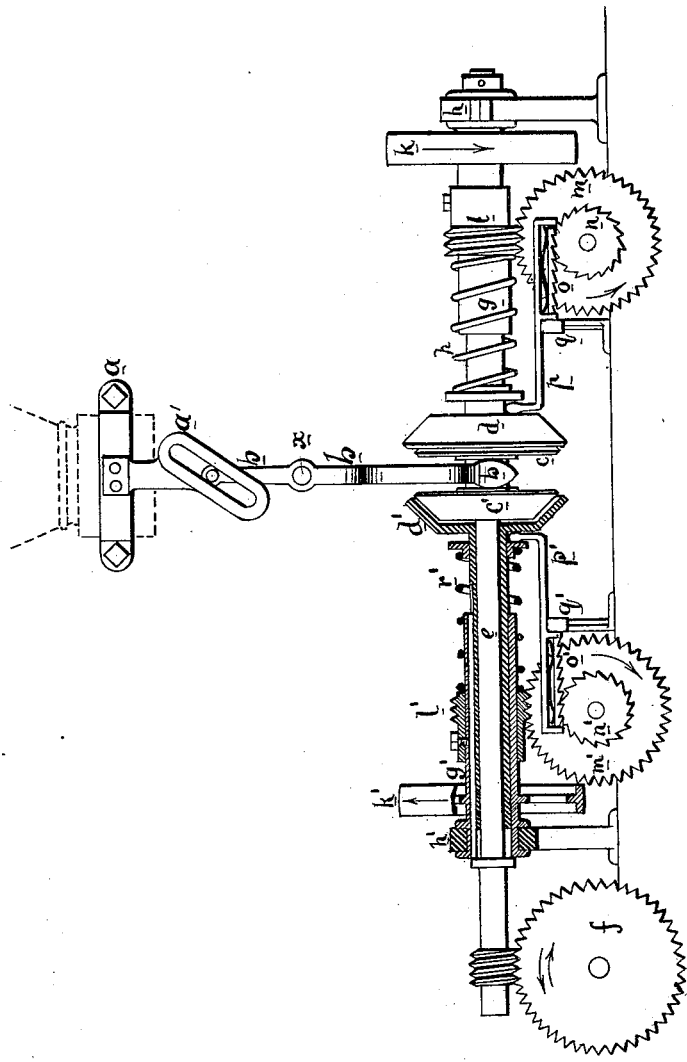

UNITED STATES PATENT OFFICE.

JOHANN G. BODEMER, OF ZSCHOPAU, SAXONY.

IMPROVEMENT IN GOVERNORS.

Specification forming part of Letters Patent No. 179,760, dated July 11, 1876; application filed July 15, 1876.

*To all whom it may concern:*

Be it known that I, JOHANN GEORG BODEMER, of Zschopau, Saxony, have invented certain Improvements in Indirect-Acting Governors, of which the following is a specification:

The object of my invention is to so construct mechanism through the medium of which centrifugal governor-balls control the action of a valve that the said mechanism will have a constant tendency to return the balls to their required position, and so regulate the valve. This object I attain in the manner which I will now proceed to describe, reference being had to the accompanying drawing, which represents a front view of the machine, partly in section.

The centrifugal governor is so connected to the yoke $a$ as to raise or lower it from its normal position at each increase or decrease in speed.

The lever $b$, which operates the friction coupling-disks $c$ $c'$, is pivoted at $x$, and is under the control of the yoke $a$ of the governor, through the medium of the pendent arm $a'$, which has an inclined slot for the reception of a pin on the end of said lever $b$. The friction disks or clutches $c$ $c'$ are connected to each other and slide longitudinally on, but cannot turn independently of, the shaft $e$, as the disks are connected to the shaft by means of a groove and feather, while the shaft acts on a sluice or an expansion-valve, &c., by a worm and the worm-wheel $f$. Attached to or forming part of the boss of the coupling-clutch $d$ is a sleeve adapted, by means of a feather and groove, to slide in but not turn independently of the sleeve $g$, to which is attached the pulley $k$. The sleeve $g$ turns in the bearing $h$, and attached or forming part of it is the worm $l$, which gears into the worm-wheel $m$ connected to the ratchet-wheel $n$. $r$ is a spring, the object of which is to push the coupling part $d$ toward the center, until arrested by the arm $p$ coming in contact with the stop $q$. When the governor rises, the clutch $c$ will be pressed against the disk or part $d$ of the clutch, so that the continuous rotation of the pulley $k$ will be transmitted, through the sleeve $g$, disk $d$, and clutch $c$, to the shaft $e$, and, consequently, to the wheel $f$, and the opening of the valve will be decreased. At the same time the disk $d$ and its sleeve, and also the arm, has been pushed back, the ratchet-bar $o$ having slipped over the inclined teeth of the ratchet-wheel $n$, since it was at liberty to recede, on account of a spring placed behind the same. The wheel $n$ now retains the bar $o$ as well as the bent arm $p$ and sleeve $d$, but as the wheel $m$ is slowly moved in the direction of the arrow by the worm $l$, the spring $r$ is free to move the aforesaid parts toward the left, according to the circumferential speed of the ratchet-wheel $n$, until the arm $p$ is arrested by the projection $q$. In case the speed with which the governor recedes from its highest to its normal position surpasses the speed with which the disk $d$ follows the same, the two parts of the friction-clutch so long remain out of contact and the worm-wheel $f$ remains at rest. But in case the governor continues to revolve a short time in too high a position, the part $d$ immediately follows the part $c$, so as to again operate the wheel $f$, through the medium of the clutch, until the governor reaches its normal position.

It will be evident that the clutch $c'$ $d'$, in connection with the sleeve $g'$ and pulley $k'$, operates in a manner similar to that above described, on the wheel $f$, to open the valve and increase the speed.

I claim as my invention—

1. The combination of the pulley $k$, connected to the part $d$ of the friction-clutch, with the portion $c$ of the clutch controlled by the governor and arranged to slide on but turn with the shaft $e$, by which the valve is operated, substantially in the manner described.

2. The combination of the part $d$ of the friction-clutch and the spring $r$ with the arm $p$, its spring ratchet-bar $o$, and the ratchet-wheel $n$, as and for the purpose set forth.

3. The combination of the pulley $k$, worm $l$, wheel $m$, and ratchet-wheel $n$, with the spring ratchet-bar $o$ and arm $p$, connected to the part $d$ of the friction-clutch, all as set forth.

4. The combination of the friction-disk $c$ with the lever $b$, its pin, and the arm $a'$, controlled by the governor and having an inclined slot, as described.

In testimony whereof I have signed my name to this specification in the presence of two subscribing witnesses.

JOHANN G. BODEMER.

Witnesses:
ROBERT R. SCHMIRZ,
PAUL DINCOLMÜLLER.